United States Patent
Arnold

(10) Patent No.: US 6,227,473 B1
(45) Date of Patent: May 8, 2001

(54) APPARATUS AND METHODS FOR PULVERIZING MATERIALS INTO SMALL PARTICLES

(75) Inventor: Charles A. Arnold, Englewood, CO (US)

(73) Assignee: C. A. Arnold & Associates, Inc., Golden, CO (US)

( * ) Notice: Subject to any disclaimer, the term of this patent is extended or adjusted under 35 U.S.C. 154(b) by 0 days.

(21) Appl. No.: 09/290,484

(22) Filed: Apr. 12, 1999

Related U.S. Application Data

(63) Continuation of application No. 08/897,015, filed on Jul. 18, 1997, now abandoned.

(51) Int. Cl.[7] .................................................. B02C 19/18
(52) U.S. Cl. ............................ 241/285.1; 241/1; 241/301
(58) Field of Search .................... 241/1, 5, 301, 241/26, 284, 275, 285.1

(56) References Cited

U.S. PATENT DOCUMENTS

| | | |
|---|---|---|
| 134,513 | 1/1873 | Ghichester . |
| 248,923 | 11/1881 | DéChamp . |
| 1,212,418 | 1/1917 | Sturtevant . |
| 1,212,419 | 1/1917 | Sturtevant . |
| 1,636,033 | 7/1927 | Agnew . |
| 1,656,756 | 1/1928 | Payne . |
| 1,669,239 | 5/1928 | Grindle . |
| 1,758,101 | 5/1930 | Bates . |
| 1,798,465 | 3/1931 | Grindle . |
| 1,911,193 | 5/1933 | Hill . |
| 2,562,560 | 7/1951 | Macartney . |
| 2,639,747 | 5/1953 | Burn et al. . |
| 2,709,552 | 5/1955 | Lecher ................................. 241/1 |
| 2,847,168 | 8/1958 | Smiley . |
| 2,940,676 | 6/1960 | Brake . |
| 3,065,919 | 11/1962 | Burkett et al. . |
| 3,160,354 | 12/1964 | Burkett . |
| 3,207,447 | 9/1965 | Whitman ............................. 241/1 |
| 3,545,683 | 12/1970 | Schulte ............................... 241/1 |
| 3,556,414 | 1/1971 | Eberly, Jr. .......................... 241/1 |
| 3,987,970 | 10/1976 | Burkett . |
| 4,144,167 | 3/1979 | Burkett et al. . |
| 4,151,794 | 5/1979 | Burkett . |
| 4,156,593 | 5/1979 | Tarpley . |
| 4,556,467 | 12/1985 | Kuhn et al. . |
| 4,690,338 | 9/1987 | Sayler et al. . |
| 4,886,216 | 12/1989 | Goble . |
| 4,989,796 | 2/1991 | Eide . |
| 5,067,661 | 11/1991 | Eide . |
| 5,192,029 | 3/1993 | Harris . |
| 5,577,669 | 11/1996 | Vujnovic ............................. 241/1 |

FOREIGN PATENT DOCUMENTS 2433657    3/1975    (DE) .................................. 241/275

OTHER PUBLICATIONS

University of Houston's Mechanical Engineering Department, "Rotating Single– and Multi–Phase Flows—the Basis for Vortex Technology", http://www.ifdt.uh.edu/vtc/rotate.html; 06/11/97.

Reba, Imants, "Applications of Coanda Effect", *Scientific American*, Jun., 1966.

*Primary Examiner*—Mark Rosenbaum
(74) *Attorney, Agent, or Firm*—Jonathan J. Wainer

(57) ABSTRACT

An apparatus pulverizes material composed of wet or dry discrete objects into relatively smaller particles with shock waves created by flowing the material through a housing having alternating rotors and orifice plates. The housing includes a first end having a feed chute for introducing the material into the housing, a second end having an opening for removing the smaller particles, and internal sides meeting in corners, which extend longitudinally between the first and second ends. A rotatable shaft extends substantially along a longitudinal central axis of the housing. Rotors each include a hub coupled to the shaft for rotation therewith, a substantially polygonal-shaped rotor plate centrally fixed to the hub and having apices, and a plurality of vanes each vanes extending approximately radially inward on a side of the rotor plate from an apex. Each orifice plate extends inwardly from the internal sides of the housing to a central aperture which provides an orifice around the shaft. Circumferentially spaced members are located proximate the rotors, wherein the members extend inwardly from the corners of the housing toward the rotors.

51 Claims, 7 Drawing Sheets

APPARATUS AND METHODS FOR PULVERIZING MATERIALS INTO SMALL PARTICLES

CROSS REFERENCE TO RELATED APPLICATION

This application is a continuation of application Ser. No. 08/897,015, by Charles A. Arnold, filed Jul. 18, 1997 and now abandoned, the entire disclosure of which is included herein by reference.

BACKGROUND OF THE INVENTION

The invention relates to apparatus and methods of pulverizing materials into small particle sizes.

Reducing large, discrete materials into smaller particles is an important process for many industries. For example, in the mining industry, ores are crushed into smaller size particles to increase the available surface area so that metals can be extracted by chemical leaching. The cement industry grinds rocks into grains of various particle sizes. Most machines used for these purposes grind larger chunks of material into smaller particles with rollers or with a ball crusher. The crushed material is typically comprised of a range of particle sizes. Both types of machinery are massive and prone to breakdown when crushing hard materials. In addition, they have large power requirements.

The recycling industry also reduces waste materials into smaller particles. Typically, materials with different compositions must be separated prior to being reduced in size, making the process more costly.

The livestock industry produces a great deal of animal waste that must be dried and reduced in bacterial content, which process can takes weeks, before being used for fertilizer or other purposes.

SUMMARY OF THE INVENTION

According to one aspect, the invention provides a rotor for an apparatus for pulverizing material comprised of wet or dry discrete objects into relatively smaller particles. The rotor includes a hub being adapted for coupling to a rotatable shaft for rotation therewith, and a rotor plate that is centrally coupled to the hub. The rotor plate has an approximately polygonal-shaped peripheral edge forming a plurality of apices. A plurality of vanes are positioned on a side of the rotor plate, wherein each of the vanes extends approximately radially inward from one of the apices. The rotor plate preferably has an odd number of sides, for example, the peripheral edge can have a shape being a member of the group consisting of a pentagon, a heptagon and a nonagon.

Each of the vanes can be positioned to provide a small overhang over the peripheral edge of the rotor plate, and positioned with respect to an apex of the rotor plate such that a leading surface of the vane, defined with respect to a direction of rotation, is at the apex. An end of each of the vanes being located near an apical corner can be shaped like the peripheral edge at that location. Each of the vanes can be curved in an arc, the concave side facing the direction for rotation. Each of the vanes can have an upper edge that is beveled such that the elevation of the upper edge generally increases with increasing distance from the hub. One type of rotor, a distributor rotor, can further include a ring fixed to the upper edges of the vanes, the ring having a regular polygonal shape being about aligned with the peripheral edge of the rotor plate.

The pulverizing apparatus, which can having at least one rotor as described above, can further include a housing having first and second ends, the first end including input structure being adapted to introduce the material into the housing, the second end including output structure adapted to remove the smaller particles. A rotatable shaft extends longitudinally through the housing between the first and second ends. The hub of each rotor is coupled to the shaft for rotation therewith. The housing can have longitudinally extending internal sides that form longitudinally extending interior corners where they meet. There may be an odd number of internal sides, for example, the sides can form a regular nonagon in lateral cross section.

The apparatus can further include an orifice plate positioned between each adjacently located pair of the rotors, each orifice plate extending inwardly from the internal sides of the housing to a central aperture which provides an orifice around the shaft. The orifices of at least two of the orifice plates can be of different sizes. In one configuration, the central aperture of each orifice plate has a diameter that is smaller than a circle defined by the locus of the apices of the rotor located immediately upstream from the orifice plate, the upstream direction being determined by a direction of movement of the material through the housing. In another configuration, the orifices generally increase in size with increasing distance from one of the first and second ends of the housing.

The apparatus can also include a plurality of circumferentially spaced members located proximate each of the rotors, wherein the members extend inwardly from the corners of the housing toward the rotors. The members can be configured as pins, which can be arranged to provide support to the orifice plates.

In a particular embodiment, the locus of the apices of each rotor defines a circle, and the circles generally increase in size with increasing distance from one of the first and second ends of the housing.

The distance between each orifice plate and the rotor positioned next nearest the first end of the housing defines a first spacing, the distance between each orifice plate and the rotor positioned next nearest the second end of the housing defines a second spacing, the distance between each pair of adjacently located orifice plates defines a third spacing, and the distance between each pair of adjacently located rotors defines a fourth spacing. In some embodiments, at least one of the first spacing, the second spacing, the third spacing, and the fourth spacing is non-uniform. One or more of the first spacing, the second spacing, the third spacing and the fourth spacing can be generally decreasing with increasing distance from the first end of the housing, and the orifices can be generally increasing in size with increasing distance from the first end of the housing.

In another aspect, the invention provides an apparatus for pulverizing material comprised of wet or dry discrete objects into relatively smaller particles, the apparatus includes a housing having a longitudinal central axis, the housing including a first end comprising input structure being adapted to introduce the material into the housing, a second end comprising output structure adapted to remove the smaller particles, and a longitudinally extending internal surface surrounding the central axis, the internal surface having sides meeting in longitudinally extending corners. A rotatable shaft extends substantially coextensively with the central axis. At least one rotor is positioned the housing and coupled to the shaft. Each rotor includes a hub being coupled to the shaft for rotation therewith in a plane transverse to the central axis, a rotor plate centrally fixed to the hub, and a plurality of vanes on a side of the rotor plate, each of the vanes extending about radially inward from a peripheral edge of the rotor plate. In one feature, orifice plates are positioned alternately with rotors, an orifice plate being arranged between each pair of adjacently located rotors. Each orifice plate extends inwardly from the internal side surface of the housing to a central aperture which provides an orifice around the shaft, the orifices being of more than one size. In another feature, a plurality of circumferentially spaced members are located proximate the at least one rotor, wherein the members extend inwardly from the side surface towards the at least one rotor. In yet another feature, the distance between each orifice plate and the rotor positioned next nearest the first end of the housing defines a first spacing, the distance between each orifice plate and the rotor positioned next nearest the second end of the housing defines a second spacing, the distance between each pair of adjacently located orifice plates defines a third spacing, and the distance between each pair of adjacently located rotors defines a fourth spacing. At least one of the first spacing, the second spacing, the third spacing and the fourth spacing is non-uniform.

In yet another aspect of the pulverizing apparatus of the invention, the housing defines a longitudinal central axis and includes a first plate at a first end, a second plate at a second end, the second plate including an opening through which the smaller sized particles exit the housing, and longitudinally extending internal sides having a substantially polygonal-shaped lateral cross-section, the sides meeting in longitudinally extending corners. A rotatable shaft extends substantially coextensively with the central axis. A feed chute extends through an opening in the first plate, the feed chute being adapted for introducing the material into the housing. A plurality of rotors are longitudinally spaced apart within the housing. Each rotor includes a hub being centrally coupled to the shaft for rotation therewith, a rotor plate being centrally fixed to the hub, the rotor plate having an approximately polygonal-shaped peripheral edge having apices, and a plurality of vanes on a side of the rotor plate being closest to the first end of the housing, each of the vanes extending approximately radially inward from one of the apices. A first rotor being a distributor rotor is positioned closest to the first plate such that material introduced into the housing through the feed chute is directed toward the distributor rotor. An orifice plate is positioned between each pair of adjacently located rotors. Each orifice plate extends inwardly from the internal sides of the housing to a central aperture which provides an orifice around the shaft. A plurality of members are positioned in the longitudinally extending corners and project radially inward therefrom, each member being located near a rotor.

Other features can be included in any of the pulverizing apparatus described above. A mechanism, such as a variable speed motor, can be coupled to the shaft for rotating the shaft at a rotational speed of at least 600 rpm. The apparatus can include an additional input structure adapted to introduce a substance through the top plate into the housing, the input structure being separate from the feed chute. The additional input structure can advantageously include a regulator mechanism configured to regulate a flow of a gas or a liquid into the housing. The pulverizing apparatus can further include a heat exchanger on an outside wall of the housing configured to provide or remove heat from the housing.

The invention also provides a method of pulverizing a material comprised of wet or dry discrete objects into relatively smaller particles. The method includes: providing a pulverizing apparatus that includes a housing, a rotatable shaft extending through the housing between first and second ends thereof, rotors coupled to the shaft for rotation therewith, a stationary orifice plate located between each adjacent pair of the rotors, each orifice plate being provided with a central aperture surrounding the shaft; rotating the rotors to cause an air flow through the housing in an alternatingly radially outward and radially inward flow path around the rotors and through the apertures; introducing the material into the first end of the housing; causing a substantial portion of the material to flow with the air flow; causing shock waves in the flowing material and air flow with the rotation of the rotors; and pulverizing the flowing material with the shock waves.

One or more other features may be included in the method. Causing a substantial portion of the material to flow with the air flow can include flowing the material at a speed sufficient to maintain a Coanda effect in the material flowing around the rotors and through the orifices. Providing a pulverizing apparatus can include providing each rotor with a substantially polygonal-shaped rotor plate having apices that are located on an imaginary circle, and vanes on a side of the rotor that extend approximately radially inward from the apices toward the shaft. Providing a pulverizing apparatus can include providing the housing with internal sides that meet in longitudinally extending corners. Providing a pulverizing apparatus can include arranging the rotors, the orifice plates and the housing to maintain a negative back pressure in the flowing material as it flows through each of the apertures. The method may further include regulating the air flow through the housing. It may include introducing a process material into the housing while introducing the first mentioned material into the housing, causing the process material to commingle with the first mentioned material.

A pulverizer apparatus according to the present invention can be employed for a variety of uses. For example, the pulverizer apparatus of the invention can be configured to pulverize rocks, including ores containing precious and/or semi-precious metal, into a fine powder. In some ores, particles of elemental components that do not easily alloy, such as gold, can be liberated from other components. Gangue material is often separated from the ore. Clays can be pulverized into fine powders for ceramic uses. The pulverizing is done with a minimal expenditure of energy and minimal wear on the pulverizer.

The pulverizer can be arranged to pulverize discard tires into small particles of rubber, with the corded fabric and steel belt components substantially separated from the rubber.

The pulverizer can be arranged to pulverize whole, unwashed aluminum beverage cans into small sized, dry particles for recycling.

The pulverizer can be arranged to pulverize bottles for recycling. The pulverizer liberates other debris that may be mixed with the bottles, such as, for example, metal caps, rubber seals, metal foil and paper. Liquid remains are completely removed. Different colored glasses can be separated by adjusting the rotational speed of the rotor assembly.

The pulverizer can be arranged for rapidly reducing an organic sludge or animal waste, such as, for example, manure, to a dry powder with a significantly reduced bacterial content.

The pulverizer may also be arranged to grind grains, pharmaceuticals, or most any non-metallic material into a powder. The size of the powder grains can be adjusted by adjusting the speed of rotation, the number of rotor and orifice plate stages, and the number of sides of the rotors.

The pulverizer can be arranged as an air scrubber, for example, in a smoke stack to change the chemical and size characteristics of the stack discharge.

The pulverizer can be arranged to pulverize ceramic components of catalytic converters, by which precious metals are conglomerated into panable particles.

The pulverizer can be configured to provide a regulated fluid input, through which a regulated amount of a gas or liquid can be added to the material being pulverized. The gas can be additional air for enhancing and regulating the flow of material through the pulverizer. The gas or liquid can be a reaction producing material to enhance a chemical transformation of the material being pulverized, or a reaction slowing or stopping material to inhibit a chemical transformation of the material being pulverized.

These and other advantages of the invention will become apparent from the following description of specific embodiments when read in conjunction with the appended drawings.

BRIEF DESCRIPTION OF THE DRAWING

Specific embodiments of the invention will now be described with reference to the drawings, in which.

DETAILED DESCRIPTION OF THE INVENTION

Figure 1:
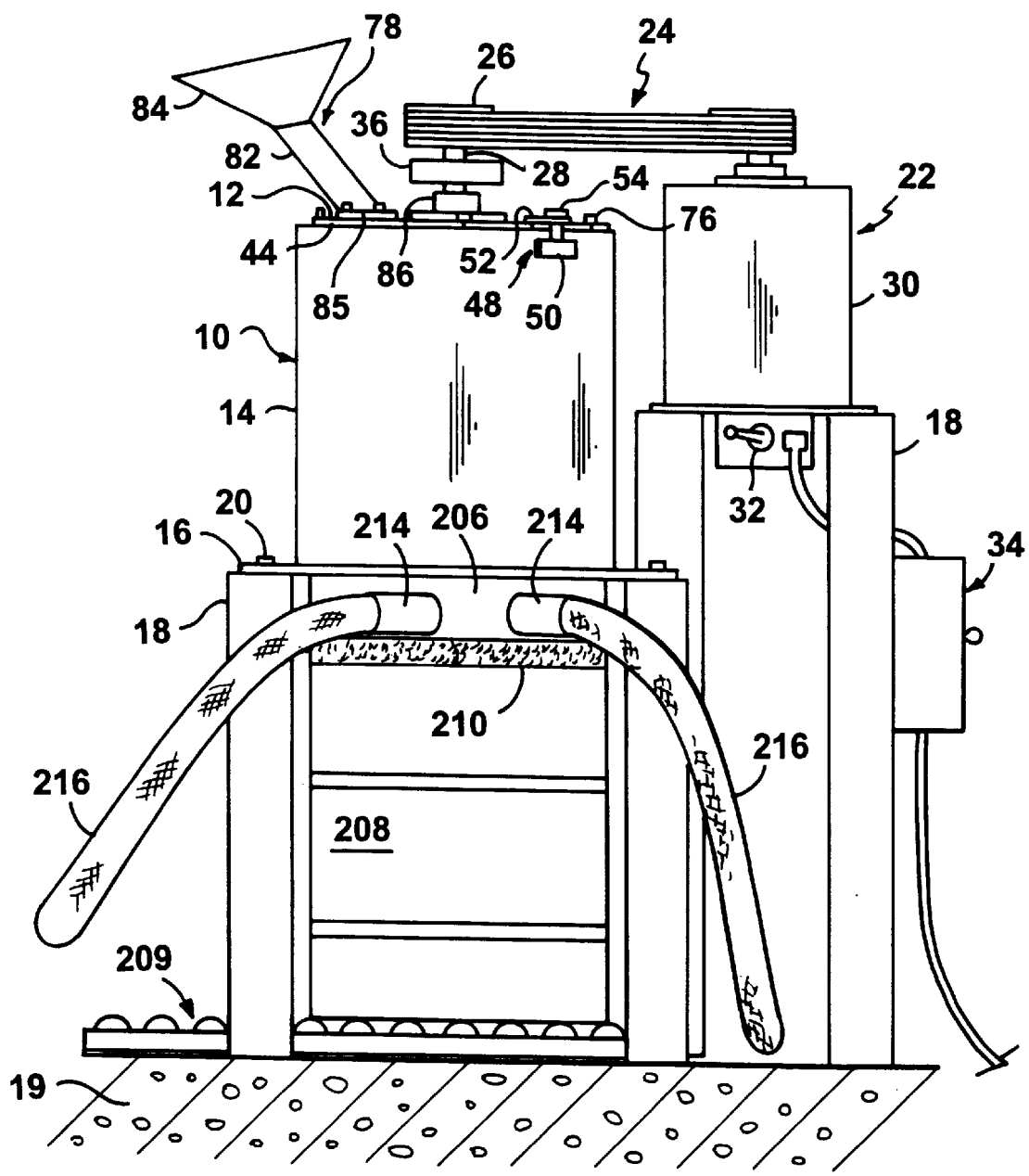
FIG. 1 is an elevation view of a pulverizer system according to the invention.
Figure 2:
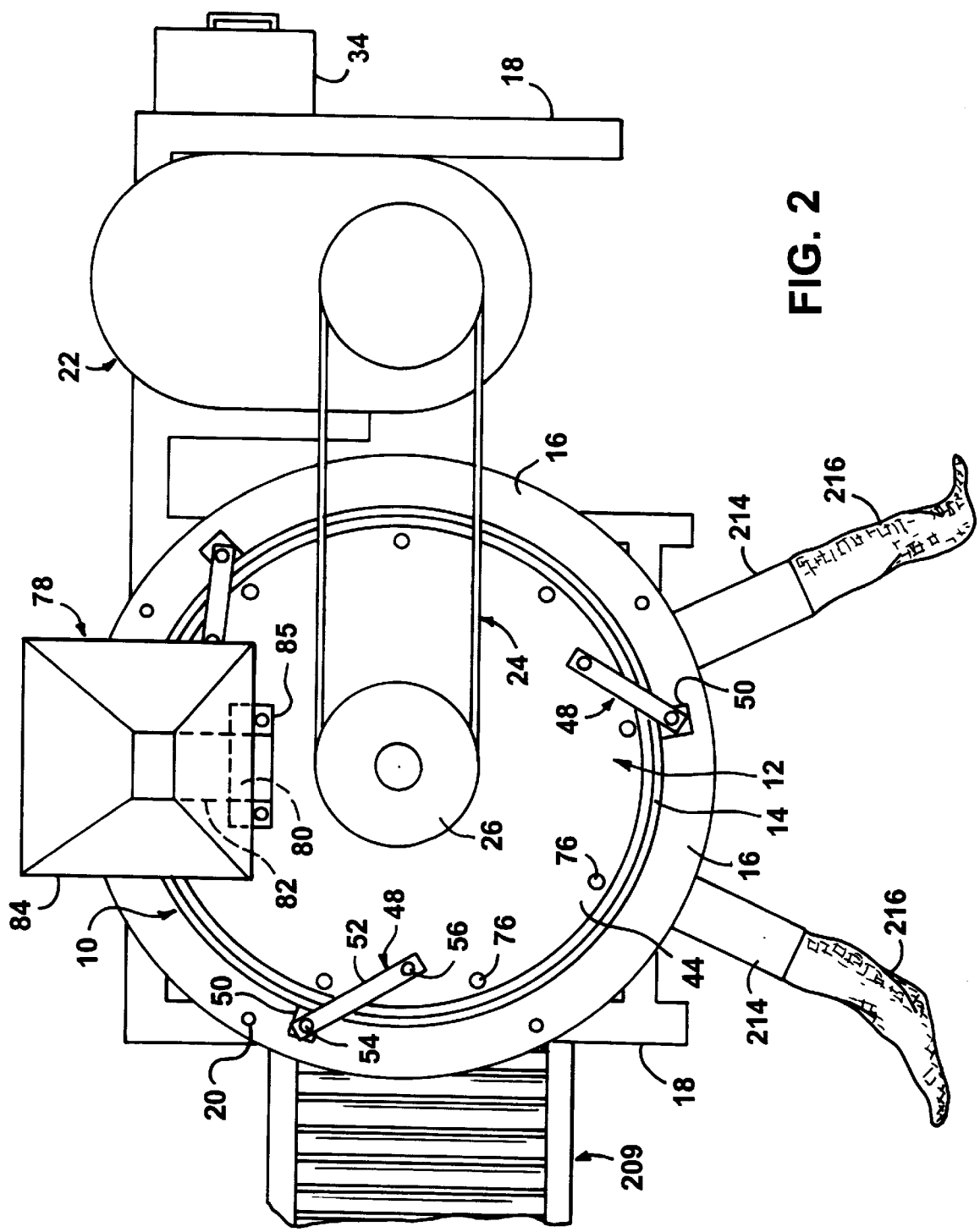
FIG. 2 is a top plan view of the pulverizer system illustrated in FIG. 1.

Referring to FIGS. 1 and 2, a pulverizer 10 employed, for example, for reducing the size of discrete objects to smaller-sized particles includes a housing 12 containing a rotor assembly 38, which will be described in detail below. While the following description of a particular embodiment refers to the described apparatus as a "pulverizer," it should be understood that the apparatus can be employed for other purposes, such as, for example, processing sludge and bio-waste, chemical processing, and air scrubbing. Housing 12 is surrounded by a cylindrical shield 14 that is supported from an annular plate 16 by a free-standing support frame 18 on a concrete slab 19. Annular plate 16 is welded to shield 14 and secured to frame 18 with bolts 20.

Frame 18 also supports a motor assembly 22, which provides rotational power to the rotor assembly via a single four-grooved belt 24 coupling to a variable mechanical sheave 26. Sheave 26 is connected to a rotor shaft 28 that extends through housing 12. Rotor shaft 28 is fabricated from 2 inch diameter, 4140 steel rod. Motor assembly 22 includes a 25 hp, 230 V, three phase motor 30 that has a variable speed control 32. Motor assembly 22 receives power from a fusible disconnect 34. The variable mechanical sheave and control 32 permit the speed of rotor shaft 28 to be continuously varied between about 600–3800 revolutions per minute (rpm). A sprocket assembly 36 attached to shaft 28 is used to measure the actual rotational speed of shaft 28. A shroud (not shown) can be used to cover belt assembly 24.

Figure 3:
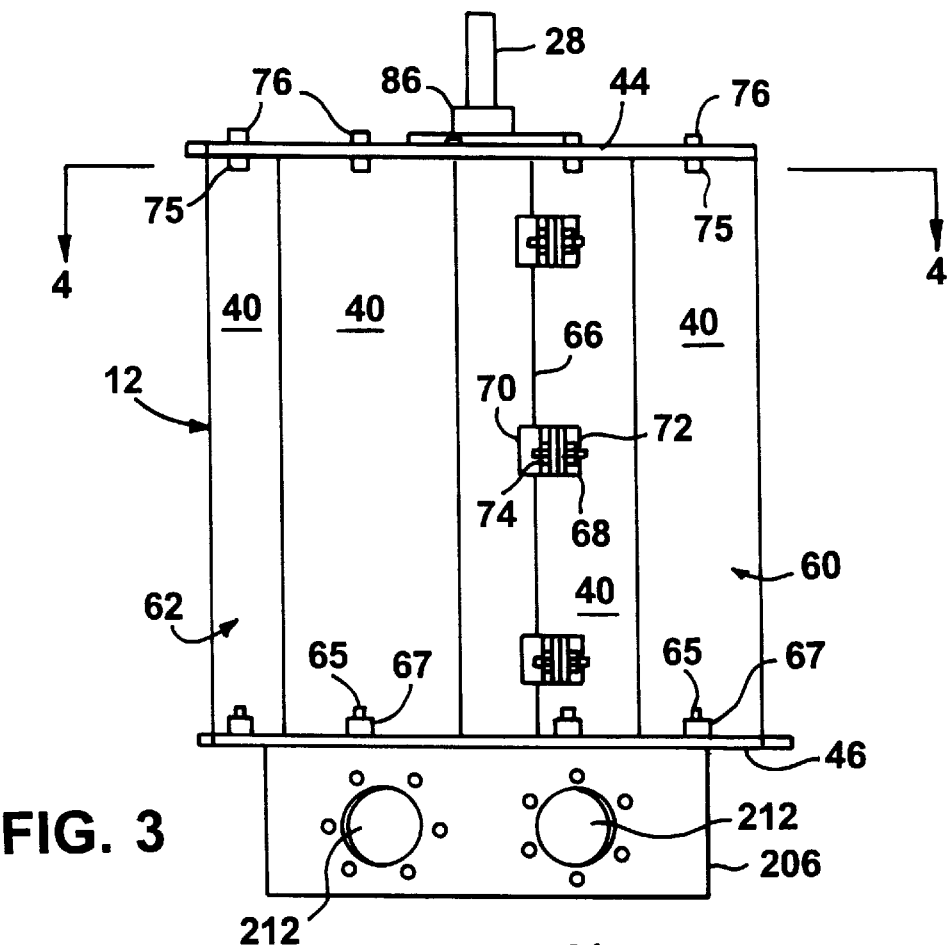
FIG. 3 is an elevation view of a rotor assembly housing of the pulverizer system illustrated in FIG. 1.
Figure 4:
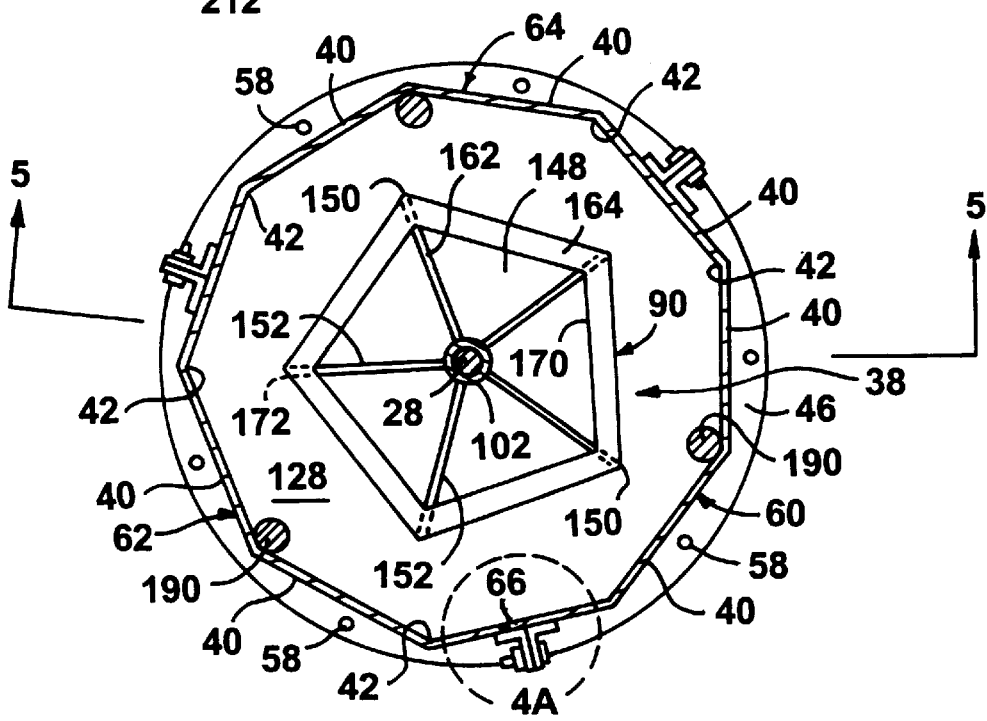
FIG. 4 is a cross sectional view through line 4—4 of FIG. 3, and in which a distributor rotor is shown in plan view.

Referring now also to FIGS. 3 and 4, housing 12 has nine longitudinally extending side walls 40 forming a regular polygon shape in latitudinal cross section. The interior surface of housing 12 has an inscribed diameter of approximately 23.5 inches. Sides 40 form 40° apices, or interior corners 42, where they meet. Sides 40 and interior corners 42 extend longitudinally between a top plate 44 and a bottom plate 46. Top and bottom plates 44, 46 are approximately 30.5 inches apart.

Top plate 44 is rigidly tied to shield 14 with three strap assemblies 48 (FIGS. 1 and 2). Strap assemblies 48 each include a bracket 50 welded to the outer surface of shield 14, a rigid strap 52, and bolts 54, 56 connecting strap 52 to bracket 50 and top plate 44, respectively.

Figure 4A:
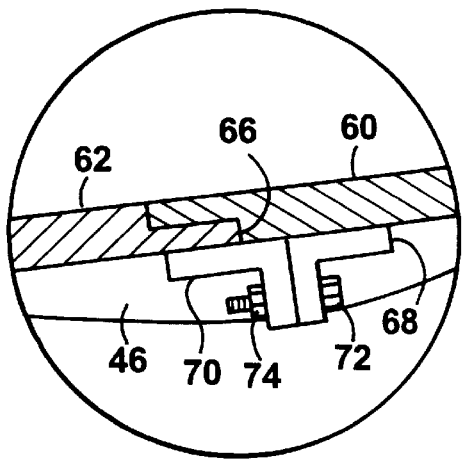
FIG. 4A is a detail of FIG. 4.

In the described embodiment, sides 40 are formed of three panels 60, 62, 64, each including two full sides 40 and two partial sides 40, and three interior corners 42. Referring now also to FIG. 4A, each pair of panels, e.g., 60 and 62, can be joined with an overlapping seam 66 located about midway between corners 42. Brackets 68 are welded to panel 60, and brackets 70 are welded to panel 62 adjacent to seam 66. Bracket pairs 68, 70 are tied together by fasteners, for example, with bolts 72 and nuts 74. A sealing joint material, such as, for example, a silicon based sealant, can be used at seam 66 and other joints between pieces of housing 12 to make housing approximately air-tight.

Referring again to FIGS. 2 and 3, bottom plate 46 is supported from a portion of annular plate 16 that extends radially inward a short distance from shield 14. A gasket (not shown) providing a liquid seal is placed between annular plate 16 and bottom plate 46. A J-bolt arrangement (not shown) can be employed for ensuring a positive seal with the gasket. Bottom plate 46 is secured to panels 60, 62, 64 with nine threaded fasteners 65 that extend through apertures formed in respective fittings 67 attached to panels 60, 62, 64, and that screw into threaded holes 58 arrayed around the periphery of bottom plate 46. Top plate 44 is bolted to threaded fittings 75 on panels 60, 62, 64 with threaded fasteners 76.

A feed chute 78 for introducing material to be pulverized (or otherwise processed) into housing 12 extends through an aperture 80 in top plate 44. For clarity of illustration, feed chute 78 is illustrated at a position in FIG. 2 that is different from the position depicted in FIG. 1. Feed chute 78 includes a rectangular shaped tube 82 that is oriented relative to the plane of top plate 44 at an angle of approximately 44 degrees. Feed chute 78 also has a funnel 84 at its top end and a bracket 86 for attachment to top plate 44. Tube 82 is approximately 13.25 inches long, extends approximately 1.375 inches below the bottom side of top plate 44, and has interior dimensions of 3×4 inches. Tube 82 includes a flange 85 for attaching feed chute 78 to top plate 44, e.g., with threaded fasteners.

The rotor assembly 38 will now be described in detail with reference to FIGS. 1 and 4–6. Rotor assembly 38 includes a rotatable shaft 28 that extends longitudinally through housing 12. Shaft 28 extends through a top bearing assembly 86 that is bolted to top plate 44. Sprocket speed indicator assembly 36 and sheave 26 are positioned on shaft 28 above top bearing assembly 86. A bottom bearing assembly 88 is bolted to the bottom side of bottom plate 46. Shaft does not extend through bottom bearing assembly 88.

Within housing 12, there are six longitudinally spaced rotors 90, 92, 94, 96, 98, 100, each being fixed to a respective hub 102, 104, 106, 108, 110, 112 that is coupled to shaft 28 by two keys (not shown). Spacers 114, 116, 118, 120, 122, which are also keyed onto shaft 28, are positioned between adjacent pairs of hubs 102, 104, 106, 108, 110, 112. Spacers 124 and 126 are positioned adjacent top plate 44 and bottom plate 46, respectively. Spacer 124 is also secured to shaft 28 with a set screw (not shown). Shaft 28 can be fabricated is made of 2 inch diameter 4140 alloy steel. The diameter of each spacer is approximately 3.5 inches. The longitudinal position of one or more than one of rotors 90, 92, 94, 96, 98, 100 can be adjusted by changing the length one or more of spacers 114, 116, 118, 120, 122, 126.

Orifice plates 128, 130, 132, 134 and 136 are positioned between adjacent pairs of rotors 90, 92, 94, 96, 98 and 100. Orifice plates 128, 130, 132, 134, 136 each extend to sides 40 of housing 12. Each of orifice plates 128, 130, 132, 134, 136 includes a central aperture, which, with its respective spacer 114, 116, 118, 120, 122, provides an annular shaped orifice 138, 140, 142, 144, 146 therebetween.

In the described embodiment, each of shield 14, annular plate 16, top plate 44, bottom plate 46, panels 60, 62, 64, rotors 90, 92, 94, 96, 98, 100, and orifice plates 128, 130, 132, 134, 136 are fabricated of 0.5 inch thick low-carbon steel, such as, for example, 1020 steel. These components may be fabricated from different materials, including harder materials and softer materials, depending upon the intended application for pulverizer 10.

Figure 7:
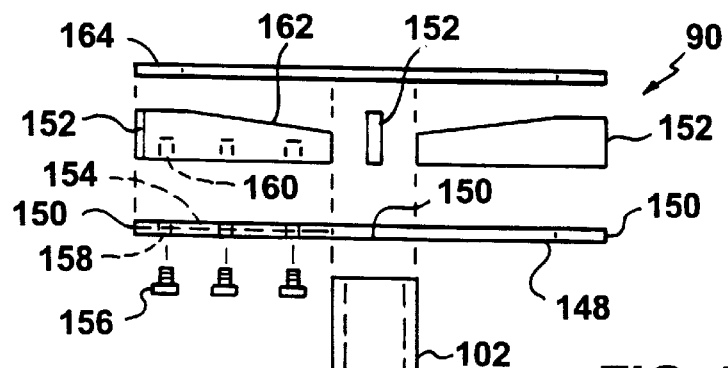
FIG. 7 is an expanded view of the distributor rotor.

Referring now also to FIG. 7, the topmost rotor 90, which will also be referred to as a distributor rotor, is positioned closest to where material is fed into housing 12 via feed chute 78. Distributor rotor 90 includes a distributor rotor plate 148 having a regular pentagonal-shaped peripheral edge forming five apices, or outside corners 150. Five distributor rotor vanes 152 extend upwards toward top plate 44 from the top side of distributor rotor plate 148 (only three vanes are shown in FIG. 7 for clarity). Each distributor rotor vane 152 also extends approximately radially inward from an outside corner 150 to hub 102. Vanes 152 can be fixed to distributor rotor plate 148 and hub 102 by welding. Alternatively, each distributor rotor vane 152 can fit into a corresponding slot 154 formed in distributor rotor plate 90, and secured by threaded fasteners 156, e.g., bolts, that extend through apertures 158 in distributor rotor plate 90 and screw into corresponding threaded holes 160 in distributor rotor vane 152. An upper edge 162 of each distributor rotor vane 152 is sloped upwards from an elevation of about 1 inch at 102 to an elevation of about 1.5 inches near the periphery of plate 148. A pentagon-shaped distributor ring 164, which is about 1.5 inches wide, is welded to the upper edges 162 of distributor rotor vanes 152.

Each of distributor rotor plate 148, distributor ring 164, and distributor rotor vanes 152 are fabricated from 0.5 inch low-carbon steel plate. Distributor rotor is circumscribed by a 17 inch diameter circle and is approximately 2.7 inches high. Distributor ring 164 is located approximately 1.625 inches below top plate 44 and approximately 0.25 inches below a discharge opening 166 of feed chute 78. Discharge opening 166 of feed chute 78 is positioned such that when a center of a chord of distributor ring 164 is aligned with discharge opening 166, a radially innermost edge 168 of discharge opening 166 extends about 0.5 inches inwardly beyond an inner edge 170 of distributor ring 164. When a corner 150 of distributor rotor 90 is aligned with feed chute 78, the outside of discharge opening 166 is completely inside distributor ring 164. This provides a large area to feed material into slots between distributor rotor vanes 152, and discharges the material from feed chute 78 onto rotor 90 as radially distant from hub 102 as possible. For reasons that will be discussed below, each vane 152 is positioned such that when rotor assembly is spinning, a trailing outer edge 172 of each distributor rotor vane 152 is shaped to be about aligned with the peripheral edge of distributor rotor plate 148 at a trailing edge of an apex 150, either without any overlap or with distributor rotor vanes 152 extending slightly over the edge of distributor rotor plate 148.

Figure 8:
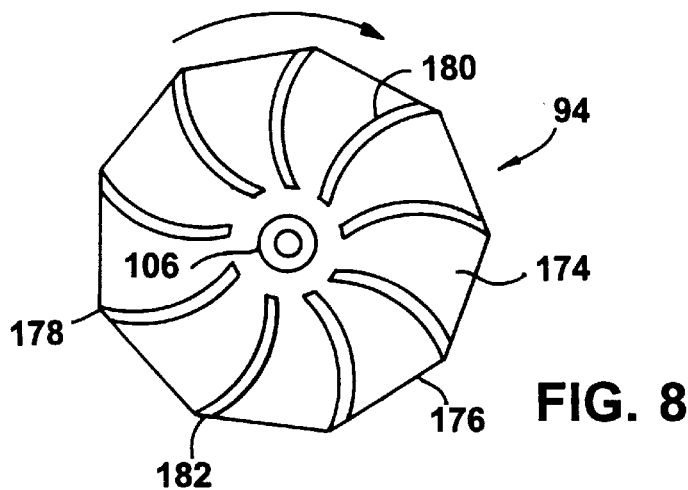
FIG. 8 is a top plan view of an orifice plate of the rotor assembly.

Other rotors 92, 94, 96, 98, 100 are designed differently from distributor rotor 90, but similarly to each other. Rotor 94 will be described as an example, with reference to FIG. 8. Rotor 94 includes a rotor plate 174 having a regular nine-sided polygonal peripheral edge 176 forming nine apical corners 178. Rotor plate 174 is welded or otherwise rigidly coupled to hub 106. Rotor 94 also includes nine curved vanes 180, each extending approximately radially inward toward hub 106 from a respective one of the apical corners 178. Vanes 180 are approximately six inches long and extend approximately one inch above rotor plate 174, which is about 0.5 inches thick. For most uses of pulverizer 10, the interior curve of each of vanes 180 faces into the direction in which rotor assembly turns. Rotor plate 174 is fabricated from 0.5 inch low-carbon steel plate, and vanes 180 are fabricated from 0.5 inch wall, 8 inch outer diameter steel tubing. Vanes 180 are set in respective 0.125 inch deep grooves (not shown) formed on an upper face of rotor plate 174, and secured in place with three threaded fasteners (not shown) that extend through apertures formed in rotor plate 174 (not shown), in a manner similar to that described above with reference to distributor rotor 90 illustrated in FIG. 7. This arrangement permits simple removal and replacement of vanes 180. Alternatively, rotors 180 may be welded to rotor plates 174, or otherwise affixed to rotor plates 174. Outer trailing edges 182 of vanes 180 are beveled at an angle to align with peripheral edge 176 of rotor plate 174 such that there is no overlap between rotor plate 174 and vane 180, or so that trailing edge 182 extends slightly over edge 176 of rotor plate 174 on the trailing side of an apical corner 178.

The other rotors, rotors 92, 96, 98 and 100, are configured similarly to rotor 94, each having a nine-sided peripheral edge 176 and curved vanes 180 extend radially inward from apical corners 178 toward respective hubs 104, 108, 110 and 112. In the embodiment illustrated in FIG. 5, rotors 92, 94, 96, 98 and 100 are circumscribed by circles having diameters of 17, 19, 21, 21, and 21 inches, respectively. Each of vanes 180 is approximately 6 inches long about its outer perimeter and shaped at its apical corner 182 so that there is little or no overlap between vane 180 and rotor plate 174 at its trailing edge 182. Each of rotors has a height of approximately 1.5 inches. Because rotor 92 is smaller than the other rotors and vanes 180 are the same size on all rotors 92, 94, 96, 96, 100, each of vanes 180 on rotor 92 extend approximately to hub 104, whereas vanes 180 on rotors 94, 96, 98, 100 do not extend all the way to hubs 106, 108, 110, 112, respectively, a gap being provided therebetween.

Figure 9:
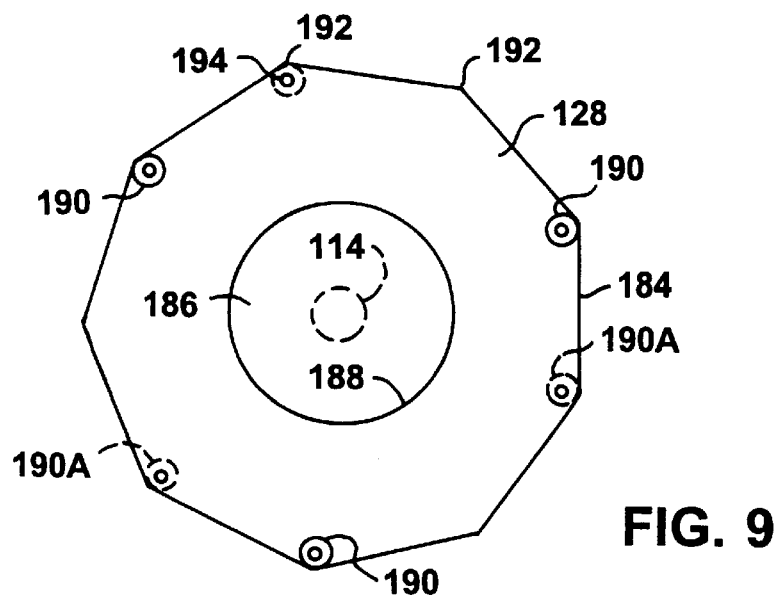
FIG. 9 is a top plan view of a rotor.

Referring now also to FIG. 9, orifice plate 128 can be fabricated from 0.5 inch low-carbon steel plate. Its peripheral edge 184 forms a nine-sided polygon sized to fit closely against sides 40 of housing 12. Orifice plate 128 includes a central aperture 186 formed by inner rim 188, which, with spacer 114, provides annular-shaped orifice 138 therebetween. Orifice plates 130, 132, 134, and 136 are similarly configured. Orifice plates 128, 130, 132, 134, and 136 have apertures 186 with diameters of 7, 8, 9, 10 and 11 inches, respectively.

Figure 10A:
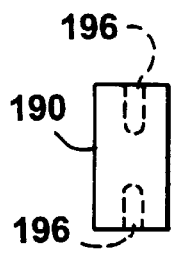
FIGS. 10A and 10B are elevation and plan views, respectively, of a rotor assembly support pin.
Figure 10B:
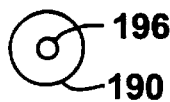
Figure 6:
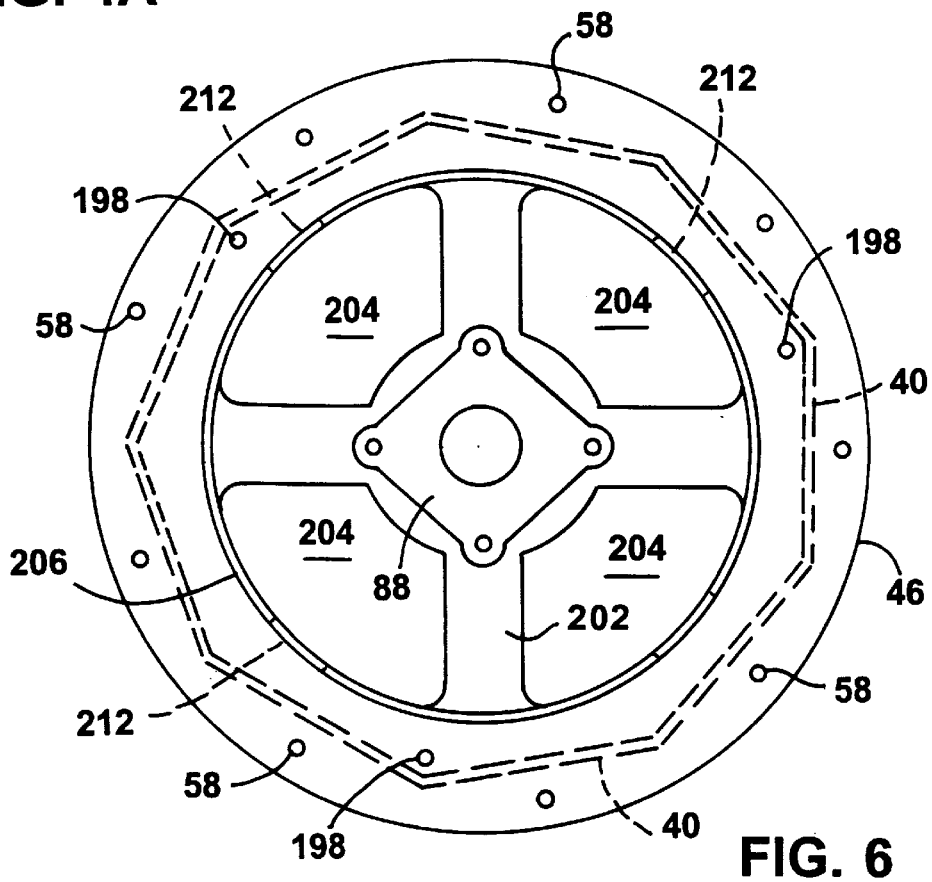
FIG. 6 is a bottom plan view of the rotor assembly housing.
Figure 5:
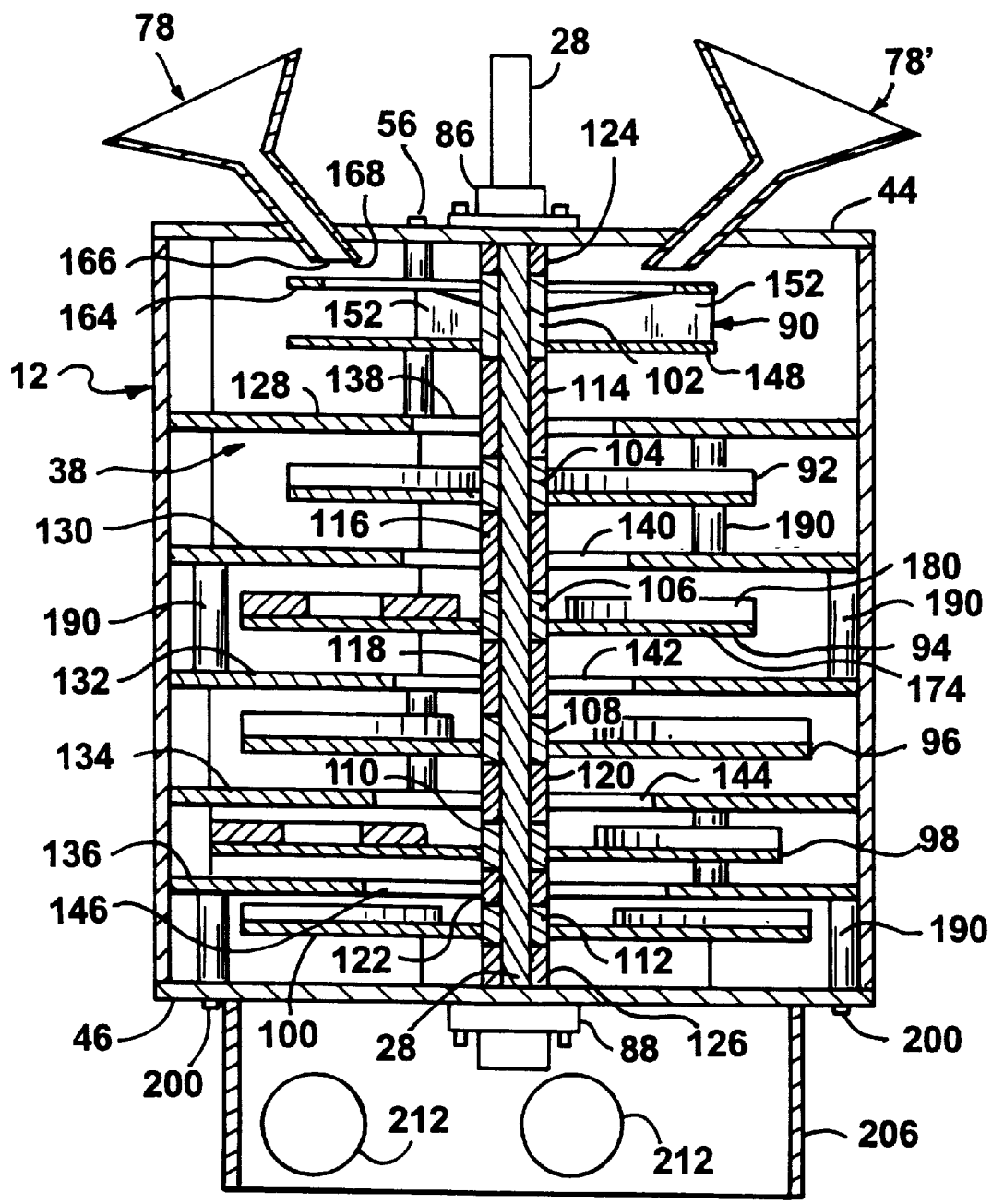
FIG. 5 is a cross sectional view through line 5—5 of FIG. 4, showing the rotor assembly within the rotor assembly housing, with a second feed chute included.

Referring back to FIGS. 4 and 5, and also to FIGS. 10A and 10B, orifice plates 128, 130, 132, 134, 136 are supported independently of panels 60, 62, 64 by support pins 190. Support pins 190 can be fabricated from 2 inch diameter steel rod. Three equally spaced apart pins 190 are positioned between each neighboring pair of the orifice plates. Each support pin 190 is located at an apical corner 192 of an orifice plate so that it is adjacent an interior corner 42 of housing. As shown in FIGS. 5 and 9, support pins 190 on one side of an orifice plate, e.g. orifice plate 128, are offset by one apex (40°) from support pins 190A on the other side of that orifice plate.

Support pins 190 are attached to the orifice plates by threaded fasteners 194, e.g., bolts, that extend into countersunk through holes (not shown) formed in the orifice plates and into threaded holes 196 formed in pins 190. Three support pins 190 that are attached to an upper side of orifice plate 128 can also be attached to top plate 44 with threaded fasteners. For example, bolts 56, which are also employed to hold straps 52 as described above with reference to FIG. 2, can be employed to fasten to these three pins 190. Three support pins 190 that are attached to a bottom side of orifice plate 136 can also be attached to bottom plate 46. Bottom plate 46 includes three apertures 198 through which threaded fasteners 200 (shown in FIG. 5) can be inserted for fastening to these three pins 190.

Referring again to FIG. 6, bottom plate 46 includes a web 202 forming four apertures 204 through which pulverized material is discharged from housing 12. A 23 inch diameter skirt 206 depends from bottom plate 46 just outside of apertures 204. Web 202 supports rotor assembly 38 from bottom bearing assembly 88, which is bolted to web 202. The size of web 202 is made as small as possible to maximize the size of apertures 204 within skirt 206.

The diameter of skirt 206 is sized to fit into a 55 gallon open barrel 208, which rests on rollers 209. A fabric belt 210 is employed between skirt 206 and barrel 208 to inhibit fine pulverized particles from escaping. Skirt 206 includes four apertures 212 (only two shown in FIG. 3). Each aperture 212 includes a bolt circle employed for attaching a respective 6 inch diameter tube 214 (only two shown in FIGS. 1 and 2). Tubes 214 extend approximately radially outward from skirt 206, and each tube 214 has a fabric filter bag 216 removably attached to it. Air is exhausted from pulverizer 10 through tubes 214. Filter bags 216 and catch fine particles and allow air to pass through.

In the described embodiment, rotors 90, 92, 94, 96, 98, 100 and orifice plates 128, 130, 132, 134, 136 are positioned as follows: The top surfaces of orifice plates 128, 130, 132, 134, and 136 are respectively located approximately 2.875, 2.125, 1.875, 1.625, and 1.375 below the bottom surfaces of respective rotors 90, 92, 94, 96, and 98. Orifice plates 128 and 130 are approximately 5 inches apart; orifice plate 130 and 132 are approximately 4.5 inches apart; orifice plates 132 and 134 are approximately 4 inches apart; and orifice plates 134 and 136 are approximately 3.5 inches apart. The tops of vanes 180 on rotors 92, 94, 96, 98 and 100 are about 1.375, 1.187, 0.875, 0.625, and 0.5 inches below respective orifice plates 128, 130, 132, 134, and 136. Rotor 100 is positioned approximately 1.75 inches above bottom plate 46. Rotors 92, 94, 96, 98 and 100 are rotated relative to their next nearest rotor by about 13.3 degrees.

It can be seen that rotors 90, 92, 94, 96, 98, 100 of rotor assembly 38 have sizes that generally increase with increasing distance from a top end of housing 12 through which material to be pulverized or otherwise processed is introduced into housing. The smallest rotors 90, 92 are located closest to top plate 44, the largest rotors 96, 98, 100 are positioned closest to bottom plate 46, and an intermediate sized rotor 94 is positioned about midway between top plate 44 and bottom plate 46. This arrangement is particularly adapted for pulverizing large size objects. If the feed material comprises smaller sized particles, on average, the rotors could be of a more uniform, larger size. In some applications, it may be advantageous to have rotors that are all the same size, or to alternate between larger and smaller rotors in some fashion.

In addition, orifices 138, 140, 142, 144, 146 are of generally increasing size with increasing distance from the top end. This arrangement is used to maintain a negative back pressure at each stage. For other applications, this arrangement could be reversed, the orifices could be a more uniform size, or the orifice sizes could be varied in a different manner from one end of housing 12 to the other.

The spacing between each orifice plate and the rotor next below it generally decreases with increasing distance from top to bottom. Moreover, the rotors and orifice plates are positioned such that the spacing between adjacent orifice plates generally decreases from top to bottom. This decreases the volume in stages between the top and bottom of rotor assembly 38.

Material flowing through an orifice in pulverizer 10 first undergoes a velocity increase and an accompanying decrease in pressure. Then, because the available volume decreases at each succeeding stage, the material flowing through pulverizer 10 experiences a rapid compression, which in turn can cause a rapid increase in pressure and/or temperature. The size of the orifice is increased with each succeeding stage to provide a pressure immediately downstream of an orifice that is lower than the pressure immediately upstream the orifice. This negative back pressure that is maintained across each orifice helps to maintain the flow.

I tested the above-described pulverizing system with several different feed-stock materials of widely varying composition, hardness, ductility, and moisture content. My tests lead me to believe that material introduced into pulverizer with rotor assembly spinning at speeds of approximately 1000 revolutions per minute (rpm) or greater are pulverized primarily by shock waves generated within housing 12. My observations indicate that material fed into feed chute 78, as well as air entering through feed chute 78, is accelerated rapidly and is then entrained into a fluid-like flow through the spinning rotor assembly 38. It appears that the material in the flow is almost immediately subjected to a rapid-fire succession of shock waves, which may begin to break up the feed-stock material even before it reaches the distributor rotor.

The spinning rotors 90, 92, 94, 96, 98, 100 create a very strong air flow through housing 12. It appears that material fed into pulverizer 10 through feed chute 78 is entrained in this flow. The material apparently flows, with the air flow, through pulverizer 10 making minimal contact with sides 40 of housing 12 or with orifice plates 128, 130, 132, 134, 136. This, I believe, is due to the flow being influenced by the Coanda effect to closely follow the contours of the rotor peripheries 174 and orifice rims 188. For this reason, I call the flow through pulverizer of material and air a "Coanda flow." The Coanda effect helps to reduce high-angle contacts between the flowing material and the component parts of pulverizer 10, and thereby reduce wear on these parts. Distributor ring 164 acts as a shroud to enhance the Coanda effect.

The Coanda flow rapidly changes direction as it rounds the peripheral edge of each rotor and the rim of each orifice, alternating between a flow that is directed radially outward and a flow that is directed radially inward. The sizes of the orifices increase with each succeeding stage to maintain a negative back pressure throughout rotor assembly 38, which helps to keep the velocity of air and particles sufficiently high to maintain the Coanda flow.

I have observed that when vanes 152, 180 are not positioned on the trailing side of apical corners 150, 178, respectively, rotor plates 148, 174 experience wear, becoming slightly rounded on the underside adjacent and downstream from where vanes 152, 180 attach. This is evidence that the material is entrained in a Coanda flow that closely follows the contour of the periphery of each rotor. The leading side of each rotor vane 152, 180, particularly in the region close to its respective rotor plate 148, 174, also shows increasing wear with proximity to its outer edge. There is also a tendency for material to ride up the side of the vane as the material is moved radially outward by the vane. However, the wear pattern shows little scoring or pitting, which would be expected if the material was not entrained in a Coanda flow. These are the only areas of rotors at which I have noticed wear. Sides 40 and orifice plates 128, 130, 132, 134, 136 show some evidence of some large particle impacts, but no wearing pattern as observed on the rotors.

To enhance the Coanda effect on the material flowing past vanes 152 and 180 and around rotor plates 148, 174, outer edges of the vanes can be beveled and aligned with the peripheral edge of the respective rotor plate 150 and 174. The leading edge of each vane 152, 180 should go at least to the respective apex 150, 178 of the respective rotor plate 148, 174. Positioning vanes 152, 180 such that their outer edges are on the trailing side of apical corners 150, 178 should reduce the amount of wear.

Shock waves may be generated each time the flowing material experiences a rapid acceleration, such as when the direction of flow rapidly changes, or experiences a pressure change. Such shock waves may generate large voltages due to the piezoelectric properties of the materials, as they experience rapid compression or decompression. Some places where large accelerations may take place include at discharge opening 166 of feed chute 78, going around vanes 152, 180, going around distributor rotor plate 148 and around rotor plate peripheral edges 176, and going around rims 188 of orifices 138, 140, 142, 144, 146. Large pressure changes may take place when the flow passes through an orifice or when the flow is pumped by a rotor.

A non-uniform electromagnetic field may also be generated within housing 12 as rotor assembly 38 rotates. Rotors 90, 92, 94, 96, 98, 100, as well as housing 12 and orifice plates 128, 130, 132, 134, 136, are all made of low-carbon steel, which is ferromagnetic. The spinning rotors would create a rapidly changing, non-uniform electromagnetic field. These electromagnetic fields could enhance piezoelectric effects in the material in the Coanda flow.

Primary pulsed standing shock waves may also be produced as vanes 152, 180 on rotors 90, 92, 94, 96, 98, 100 alternately pass sides 40 and corners 42 of housing. Decompression would occur as the rotors pass each empty interior corner 42 of housing 12, and compression would occur as the vanes pass the center of each side 40. A shock wave of this type would be created every 40 degrees of rotation of a vane.

Moreover, secondary pulsed standing shock waves may be produced as vanes 152, 180 pass by support pins 190, three of which are located proximate each rotor. Vanes 180 of the largest rotors, rotors 96, 98, 100, pass within about 0.1 inches of support pins 190. These shock waves would be produced every 120 degrees of rotation of a vane on a rotor due to compression of the flow as the vane passes each of the three support pins located near the rotor. Twenty-seven shock waves are generated for each rotation of a nonagon-shaped rotor. Thus, support pins 190 are employed to support the orifice plates and also to help generate shock waves. While in the described embodiment cylindrical support pins are employed for these purposes, a different arrangement can be used to support the orifice plates, and differently shaped members can be positioned in corners 42 opposite respective rotor vanes 150, 180 for generating the secondary shock waves.

Before material is fed into pulverizer, rotor assembly 38 is brought up to an operating speed of rotation. The spinning rotors generate a large air flow with negative back pressure through feed tube 78 and down through pulverizer 10. Thus, any material fed into feed tube 78 will be immediately drawn in and accelerated rapidly towards distributor rotor 90.

As noted above, material may be broken apart while accelerating down feed chute 78 and turning direction exiting discharge opening 166. It is believed that discharge opening 166 acts as an orifice through which air and the feed-stock material flows into the larger-volume region between top plate 44 and distributor rotor 90. The flow through this first orifice provided by discharge opening 166 can cause a pressure change, which may be accompanied by a temperature change. The pressure change, along with the rapid acceleration of the particles exiting feed tube 78, can cause a first shock compression and/or expansion and an initial breaking apart of some particles.

Smaller particles, less than about 1–1.5 inches in size, are quickly entrained in the Coanda flow and would flow through distributor rotor 90 between distributor rotor plate 148 and distributor ring 164. Larger size particles may be accelerated against sides 40 of housing, which may break the particles apart further, such that they bounce back inwardly and are entrained in the high velocity Coanda flow.

Distributor rotor 90 has five apical corners, rather than nine, to create longer wavelength shock waves, which I have found to be effective for breaking up larger particles. For this reason, in other embodiments that may be used for breaking up very hard materials, rotors 92, 94, 96, 98 and 100 may be configured with a generally increasing number of sides with increasing distance from a top end of housing 12 through which material is introduced. For example, distributor rotor 90 and rotor 92 could be configured as pentagons, rotors 94 and 96 as heptagons, and rotors 98 and 100 as nonagons.

When the Coanda flow passes through orifice 138, the particles experience a rapid directional change and an increase in velocity with a corresponding pressure rise. The flow is immediately compressed because the-volume between orifice plate 128 and rotor 92 is smaller than the volume between rotor 90 and orifice plate 128. This can also cause a rapid increase in pressure and an accompanying temperature increase. At this stage, there would still be some high-velocity impacts of larger particles against sides 40 and against pins 190, the larger particles bouncing off these structures or breaking up and then colliding with particles in the Coanda flow.

This process of rapid acceleration, expansion, and compression is repeated as the flow passes through each succeeding stage and rounds the rotors and orifices. These rapid variations in pressure and acceleration of the flowing material may contribute to creating shock waves which pulverize material flowing through pulverizer 10. In addition, the rapid compressing and decompressing of material in the flow can cause a build-up of piezoelectric energy and subsequent releases in the material, which may cause the break-up of some material into smaller sized particles. It is believed that the primary and secondary pulsed shock wave fronts are reinforced by shock waves created by piezoelectric energy releases in the flow. The rapid flow of material through the non-uniform electric and magnetic fields within pulverizer 10, which are generated by the spinning rotors, may also contribute to piezoelectric compression and decompression of material in the flow, thus also contributing to generating shock waves in the flowing material.

In some tests, I measured voltages within housing 12 at a location about midway between two corners 42 of sides 40, opposite rotor 96. I observed voltage spikes in the range of 100–200 kV, which I interpret to be piezoelectric energy releases. To measure the voltage, I used an oscilloscope to measure the voltage across a spark plug having a gap of about 0.050 inches. The spark plug was inserted through a hole in housing such that only the terminals of the spark plug protruded into housing. The spark plug would typically be destroyed within about 30 seconds of introducing the feedstock material into pulverizer 10.

I have observed that pulverizer 10 heats a material being pulverized such that virtually all free moisture is driven off. All product comes out of pulverizer 10 warmed to approximately 50–100 degrees Celsius or higher. Electric discharges from the material and the rapid expansion then compression after the flow passes through each orifice may increase the temperature of the flowing material and drive moisture out. It appears that volatile organic materials are also vaporized out of the flowing material or otherwise transformed.

The piezoelectric energy releases and frictional heating of particles in the flow likely contribute to the observed general increase in temperature of the pulverized material. However, I also observed that flowing only air through pulverizer 10 caused housing 12 to warm substantially. Therefore, some of the heating effect is also probably due to pressure changes in the flowing material and energy dissipated from shock waves.

The spacings between orifice plates, between rotors and between adjacently located rotor and orifice plates may be varied for a particular purpose. Changing one or more of these spacings will affect the amount of compression and decompression the flowing material experiences, particularly as it flows through an orifice. As the distance from the top plate increases in the arrangement illustrated in FIG. 5, the spacings between orifice plates, between rotors, and between orifice plates and adjacently located rotors decreases, while the sizes of the orifices and of the rotors increase. This arrangement creates a pressure drop as the flow crosses each orifice, while increasing the bulk material density in the flow as the flow moves through succeeding stages in the housing. The number of particles and the particle density increases with each succeeding stage as more material is pulverized. The increasing particle density can cause the particles in the flow to grind against each other, further pulverizing material into smaller particles and heating the product.

Although the relative importance of each mechanism is not yet fully understood, it is certain that large particles are pulverized into smaller particles, and the particles are heated and dried out by the process.

Specific tests will now be described.

EXAMPLE 1

Aluminum Cans

I introduced whole, unwashed, aluminum beverage cans into feed chute 78 with rotor assembly 38 spinning at 3200 rpm. The beverage cans each included a plastic liner and some included a beverage and/or other residue of unknown origin. All the cans included painted indicia. Pulverizer 10 produced rough-shaped aluminum particles being 100%–10 mesh, and approximately 90–95%+80 mesh. The pellets did not show any noticeable remnants of the plastic linings or leftover beverages, and much of the paint was removed.

When housing 12 was opened after testing with aluminum cans, there were a few pieces of aluminum wrapped on the inside edge of distributor ring 164. This problem may be eliminated by removing distributor ring 164 from distributor rotor 90.

EXAMPLE 2

Clay

I fed a combination of clay chunks, which has an origin in the vicinity of Golden, Colo., having 35% water content into pulverizer 10 with rotor assembly 38 spinning at speeds of 2000, 2500, 3000, and 3200 rpm. The clay chunks were approximately 1–4 inches in size. For each rotation speed, pulverizer 10 reduced the clay chunks to a dry clay powder having a size distribution range of 50% 6 $\mu$m; gangue materials, including quartz, that were in the clay deposit, were reduced to somewhat larger sizes which could be easily separated by screening or cyclonic separation. The water content was reduced to a level where the clay powder product was noticeably hydrophilic. After being left out overnight, the clay powder product visibly reddened. This is evidence that the particle sizes were small enough for the clay powder product to auto-oxidize.

I repeated the test with dry clay ore and achieved the same result. This provides evidence that pulverizer 10 can be effective in removing moisture from a feed stock material.

EXAMPLE 3

Gold Ores (A) I fed chunks of quartz/serpentine gold ore, which originated from the vicinity of Oatman, Ariz., having a nominal size of approximately 1.5 inches into pulverizer 10 with rotor assembly spinning at 3200 rpm. Pulverizer 10 reduced the ore to a powder having a particle size of approximately 50%–325 mesh. Many rough-shaped particles of gold were liberated from the ore.

(B) I also tested a quartz/pyrite gold ore from Costa Rica. 1.5 inch chunks of this ore were fed into pulverizer 10 spinning at 3200 rpm. Pulverizer 10 reduced the chunks to particles of 100%–225 mesh size. Gold and silver particles were both liberated from the ore.

(C) I tested an Alaskan gold/copper sulfide ore having 15% free carbon. I fed wet 3 inch chunks of this ore into pulverizer 10 with rotor assembly 38 spinning at about 3000 rpm. Pulverizer 10 produced particles sized 100%–325 mesh. The gold, along with all the free carbon, appeared completely liberated. Copper sulfide was also broken away from gangue material.

EXAMPLE 4

Tires

I fed cut up pieces of steel-belted and fiber-belted tires that were about 0.5–1 inch in size into feed chute 78, with rotor assembly 38 spinning at about 3200 rpm. Pulverizer 10 produced a product in which the fabric and steel components were substantially separated from the rubber component. The fabric component, which originally consisted of corded fibers, was reduced to individual fiber strands that were, for the most part, swept into filter bags 216 with exhaust air. The steel and rubber dropped into barrel 208. Pulverizer 10 separated the steel into individual wire pieces up to approximately 1 inch in length. some of the steel wires were folded over. Rubber particles produced by pulverizer were about an eighth of an inch in size. A few fabric fiber strands tangled around particles of rubber. The steel can be separated from the rubber by conventional means, e.g. with a magnet.

EXAMPLE 5

Ceramic Balls

I fed a few hundred one inch ceramic balls, obtained from Coors Ceramic Company, of Golden, Colo., into pulverizer 10 with rotor assembly 38 spinning at about 3200 rpm. The ceramic has a hardness of at least 9 Moh. Pulverizer produced particles grains of about 95%–100 mesh size. There was evidence that some of the balls impacted components of rotor assembly 38 and side walls 40 at high velocity. The impacts left rounded dimples on surfaces of the soft steel components of rotor assembly 38 and housing 12, principally in the region of distributor rotor 90. Most surfaces showed little or no dimpling. The dimples were almost all approximately spherical-shaped, the largest dimple diameters being about 0.28 inch diameter and about 0.03 inch deep. There was very little damage to rotors 90, 92, 94, 96, 98, 100 or to orifice plates 128, 130, 132, 134, 136. The lack of more extensive damage to rotor assembly 38 is evidence that the pulverizer does not operate by smashing the feedstock against surfaces of sides 40 of housing 12.

EXAMPLE 6

Perlite

I fed a Nevada perlite with corundum component, sized up to 4 inches, into pulverizer with rotor assembly spinning at 3200 rpm. The ore was reduced to a 50% 6 $\mu$m powder. Corundum as well as other metallic particles were completely liberated. In this test, I measured voltages as high as about 170 kV with a spark plug, as described above.

EXAMPLE

Glass Bottles

I fed a mix of different colored glass bottles, some being whole, some being broken, some having metal/plastic caps attached and contents sealed within the bottle, and some having some unknown food/dirt content, into pulverizer 10 with rotor assembly 38 spinning at about 3200 rpm. Pulverizer separated the material into component parts: a dry, fine glass powder about 10 $\mu$m; cap chunks; shreds of paper labels up to ⅛ inch size; small bits of aluminum foil folded but not balled; and a few pieces of rubber chunks from bottle cap seals. There was no evidence of organic residues other than a grey, clay-like, floatable dust.

I did a second test of bottles of mixed colors, with rotor assembly 38 spinning at about 2500 rpm. For reasons that are not fully understood, different color glass components were pulverized to different coarseness. Clear glass was ground the finest, green glass was ground somewhat coarser, brown coarser yet, and yellow the coarsest. This could have applications in the recycling industry or other applications where it is undesirable to mix different colors of glass. It is possible that the separation process could be improved at slower rotational speeds.

EXAMPLE 8

Wollastonite

New York wollastonite (CaSiO3) particles, being −0.5 inch mesh size, were fed into pulverizer 10 with rotor assembly spinning at about 2000 rpm. Pulverizer 10 appeared to completely liberate the wollastonite fibers and gangue material. The product fibers had a length to diameter ratio of greater than about 20.

EXAMPLE 9

Catalytic Converters

I introduced ceramic pieces from automobile catalytic converters into pulverizer 10. After passing the material through pulverizer six times with rotor assembly 38 spinning at about 2500 rpm, pulverizer 10 produced visible, panable pieces of Pt group metals (Pt, Pd, Rh). I measured sparks with a voltage of approximately 100 kV with a spark plug and oscilloscope.

EXAMPLE 10

Calcined Alumina

Calcined alumina particles having a nominal size of approximately 50 $\mu$m were fed into pulverizer 10 with rotor assembly 38 spinning at 3200 rpm. Pulverizer reduced the nominal particle size to 50% 6 $\mu$m.

EXAMPLE 11

Calcium Carbonate

I fed calcium carbonate of sizes ranging from 6 $\mu$m–1 inch into pulverizer 10 spinning at 3200 rpm. Pulverizer reduced the particle size distribution to 50% 6 $\mu$m.

The basic design of a pulverizer can be modified to suit a particular purpose. For example, a second feed chute 78A can be employed at a position diametrically opposed to feed chute 78, as illustrated in FIG. 5, to introduce a process material to pulverizer 10 simultaneously with introducing a feed-stock material to be pulverized and processed through feed chute 78. The process material may be in liquid or dry form, or can even be a gaseous material. The feed-stock material can be dry discrete objects or a wet material, and can be of uniform composition or a composite. In this way, the feed-stock material can be chemically processed, sterilized or otherwise altered by interacting with the process material as the starter material is pulverized into smaller particles and/or dried.

Alternatively, second feed chute 78A can be employed to introduce a reaction-inhibiting material, such as, for example, an inert or non-reactive gas or liquid, into housing 12 to inhibit a chemical alteration, such as oxidation, of the starter material. Second feed chute 78A can also be employed to feed additional quantities of the same material as is introduced into housing 12 through feed chute 78.

Second feed chute 78A may be configured differently from feed chute 78. For example, feed chute 78A can be adapted particularly for introducing a liquid or gaseous process material into pulverizer. In one example, chlorine can be introduced into feed chute 78A for disinfecting organic wastes. A regulator valve 79 can be employed with feed chute 78A to regulate the flow of the liquid or gaseous material into housing for optimizing the process. Finally, feed chute 78A can also be employed for permitting additional air to be introduced into housing, the air flow being regulated by regulator valve 79.

While in the described embodiment, housing 12 has nine sides 40, a housing with as few as five and as many as eleven sides may be employed. An odd number of sides 40 is preferred because it reduces the likelihood of resonances being developed. For the same reason, I have employed an odd number of pins 190 and have employed rotors 90, 91, 94, 96, 98, 100 that have an odd number of corners and vanes, although an even number of pins and rotors that have an even number of corners and vanes may be employed as well. Rotors with as few as five and as many as thirteen sides can be used. More or fewer than three support pins may be used opposite each rotor.

The shapes of rotor plates 148, 174 can be varied from a strictly polygonal shape. For example, a small amount of rotor plate 148, 174 may be scalloped out immediately behind the trailing edge of each of vanes 152, 180, respectively. This may enhance the Coanda flow and reduce wear on rotor plates 148, 174 in this region.

It may be advantageous to run rotor assembly 38 in reverse. Rotor vanes 180, being curved in the direction of rotation, would not scoop flowing material as they do when rotating in the forward direction. Instead, the flowing material would slip more easily off the outer tips of vanes 180. This may be desirable where it is necessary to run at a high rotational speed but a very fine particle size is not wanted. This method may be employed for producing cracked wheat or for cracking other grains.

Shield 16 can be configured for flowing water, another liquid or a gas therethrough to act as a heat sink or source for pulverizer 10 in a heat exchanger. This could be important in some applications, for example, where a temperature-sensitive chemical process is being undertaken as a material is being pulverized.

Figure 11:
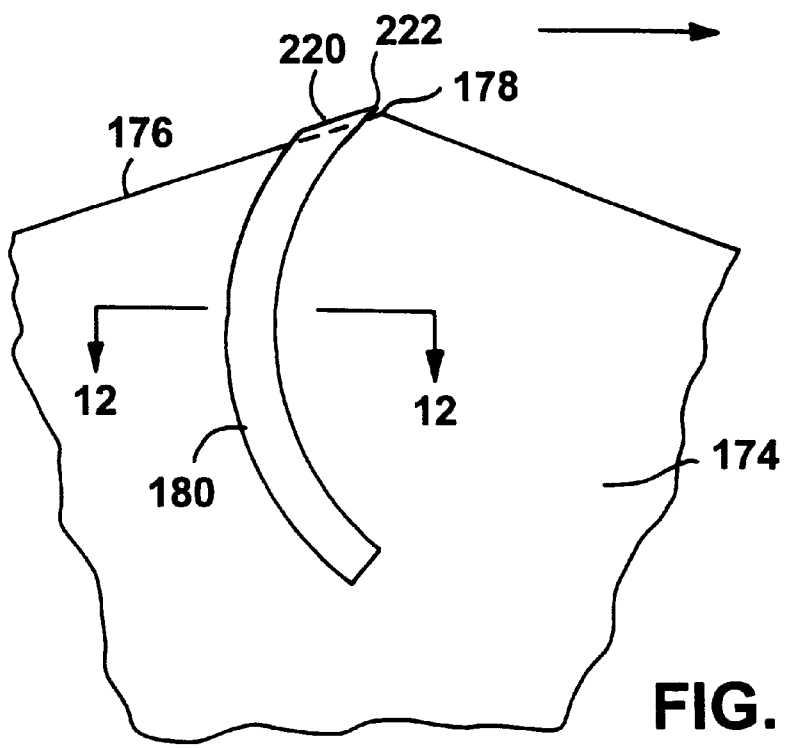
FIG. 11 is a plan view of a portion of a rotor with another embodiment of a rotor vane.

Referring now to FIG. 11, each of vanes 180 may be positioned to provide a small overhang 220 over the edge 176 of the rotor plate to which it is attached. overhang 220 would be no more than about a thirty-second of an inch, and would enhance the Coanda flow. Note that vane 180 illustrated in FIG. 11 is also positioned such that overhang 220 is shaped similar to edge 176 of rotor plate 174, and an outer tip 222 of its leading surface 224 is positioned about over apical corner 178. The arrow in the figure indicates a direction of rotation.

Figure 12:
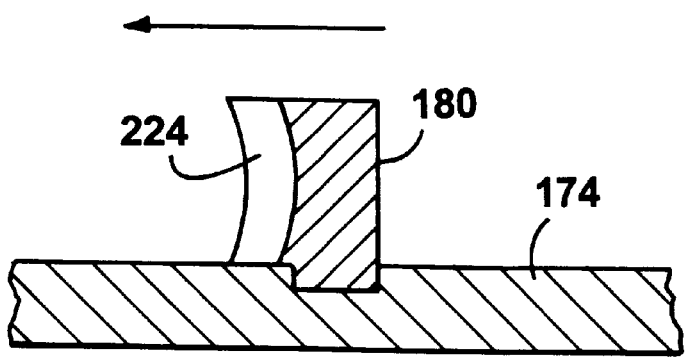
FIG. 12 is a cross sectional view through line 12—12 of FIG. 11.

Referring now to FIG. 12, vanes 180 may also be modified to have a curved profile, like a turbine blade, on its leading surface 224 with respect to a direction of rotation (arrow) to provide a more efficient pumping action.

The materials employed for making components of pulverizer can be modified from those described above to suit a particular application. For example, for pulverizing very hard materials, rotors can be manufactured from a more durable alloy, or have a coating that is resistant to wear or to damage from impacts.

Pulverizer 10 does not need to be arranged vertically, with feed chute 78 located at the top. In some applications, such as, for example, when employed as an air scrubber, material may flow in from a bottom end or pulverizer may be arranged at an angle to vertical.

A pulverizer may be configured for a particular application with more than six or less than six rotors, and with a commensurately increased or decreased number of orifice plates.

Other variations and modifications can be made to the described embodiments without departing from the spirit of the invention, the scope of which is defined in the following claims.

What is claimed is:

1. Apparatus for pulverizing material comprised of wet or dry discrete objects into relatively smaller particles, the apparatus comprising:

a housing having a longitudinal central axis, the housing including a first end comprising input structure adapted to introduce the material into the housing, a second end comprising output structure adapted to remove the smaller particles, and an internal surface extending longitudinally between the first and second ends;

a rotatable shaft extending substantially along a longitudinal central axis of the housing;

at least one rotor, each rotor including a rotor plate coupled to the shaft for rotation therewith, and a plurality of vanes on a side of the rotor plate, each of the vanes extending approximately radially; and a plurality of circumferentially spaced members located proximate the at least one rotor, wherein the members extend inwardly from the internal surface towards the at least one rotor.

2. The apparatus of claim 1, wherein the housing internal surface forms a polygon shape in cross section having a plurality of sides, the sides forming longitudinally extending corners where they meet, wherein the circumferentially spaced members are located in longitudinally extending corners, and wherein the rotor plate of each of the at least one rotor includes a substantially polygon-shaped peripheral edge having apices, and wherein each of the vanes extends approximately radially inward from one of the apices.

3. The apparatus of claim 2, the at least one rotor including a plurality of rotors, the apparatus further comprising an orifice plate arranged between each adjacent pair of the rotors, each orifice plate extending inwardly from the sides of the housing to a central aperture which provides an orifice around the shaft.

4. The apparatus of claim 3, wherein each rotor plate has a shape that is a member of the group consisting of a pentagon, a heptagon, and a nonagon, wherein the polygon shape formed by the internal surface of the housing is a nonagon, and wherein three members are positioned proximate each of the rotors.

5. The apparatus of claim 4, wherein the distance between each orifice plate and the rotor positioned next nearest the first end of the housing defines a first spacing, wherein the distance between each orifice plate and the rotor positioned next nearest the second end of the housing defines a second spacing, wherein the distance between each pair of adjacently located orifice plates defines a third spacing, wherein the distance between each pair of adjacently located rotors defines a fourth spacing, and wherein at least one of the first spacing, the second spacing, the third spacing and the fourth spacing is non-uniform.

6. The apparatus of claim 5, wherein one or more of the first spacing, the second spacing, the third spacing and the fourth spacing generally decreases with increasing distance from the first end of the housing, and wherein the orifices generally increase in size with increasing distance from the first end of the housing.

7. The apparatus of claim 6, wherein the circumferentially spaced members are comprised of longitudinally extending pins that also provide support to the orifice plates.

8. An apparatus for pulverizing material comprised of wet or dry discrete objects into relatively smaller particles, the apparatus comprising:
- a housing having a longitudinal central axis, the housing including a first end comprising input structure adapted to introduce the material into the housing, a second end comprising output structure adapted to remove the smaller particles, and a longitudinally extending internal surface surrounding the central axis, the internal surface having sides meeting in longitudinally extending corners;
- a rotatable shaft extending substantially coextensively with the central axis;
- a plurality of rotors being longitudinally spaced apart within the housing, each rotor comprising a rotor plate coupled to the shaft for rotation therewith in a plane transverse to the central axis, and a plurality of vanes on a side of the rotor plate, each of the vanes extending about radially; and
- a plurality of orifice plates arranged alternately with the rotors, each orifice plate extending inwardly from the internal side surfaces of the housing to a central aperture which provides an orifice around the shaft, wherein the orifices are of more than one size.

9. The apparatus of claim 8, wherein each rotor plate comprises a substantially polygon-shaped peripheral edge having apices, and wherein each of the vanes extends approximately radially inward from one of the apices.

10. The apparatus of claim 9, wherein the orifices generally increase in size with increasing distance from one of the first end and the second end.

11. The apparatus of claim 9, wherein each rotor plate has a shape is a member of the group consisting of a pentagon, a heptagon, and a nonagon, and wherein the sides of the housing form a nonagon.

12. The apparatus of claim 9, wherein the apices of the rotors are circumscribed by imaginary circles of generally increasing size with increasing distance from the first end.

13. The apparatus of claim 9, further comprising a plurality of circumferentially spaced members located proximate each of the rotors, wherein the members extend inwardly from the longitudinally extending corners toward the rotor.

14. The apparatus of claim 9, wherein the distance between each orifice plate and the rotor positioned next nearest the first end of the housing defines a first spacing, wherein the distance between each orifice plate and the rotor positioned next nearest the second end of the housing defines a second spacing, wherein the distance between each pair of adjacently located orifice plates defines a third spacing, wherein the distance between each pair of adjacently located rotors defines a fourth spacing, and wherein at least one of the first spacing, the second spacing the third spacing and the fourth spacing is non-uniform.

15. The apparatus of claim 14, wherein one or more of the first spacing, the second spacing, the third spacing and the fourth spacing generally decreases with increasing distance from the first end, and wherein the orifices generally increase in size with increasing distance from the first end.

16. An apparatus for pulverizing material comprised of wet or dry discrete objects into relatively smaller particles, the apparatus comprising:
- a housing having a longitudinal central axis, the housing including a first end comprising an input adapted to introduce the material into the housing, a second end comprising an output adapted to remove the smaller particles, and longitudinally extending internal side surfaces surrounding the central axis, the internal side surfaces meeting in longitudinally extending corners;
- a rotatable shaft extending substantially coextensively with the central axis;
- a plurality of rotors longitudinally spaced apart within the housing, each rotor comprising a rotor plate coupled to the shaft for rotation therewith in a plane transverse to the central axis, and a plurality of vanes on a side of the rotor plate, wherein each rotor plate comprises a substantially polygon-shaped peripheral edge having apices, and wherein each of the vanes extends approximately radially inward from one of the apices; and
- an orifice plate arranged between each pair of adjacently located rotors, each orifice plate extending inwardly from the internal side surfaces of the housing to a central aperture which provides an orifice around the shaft, wherein the distance between each orifice plate and the rotor positioned next nearest the first end of the housing defines a first spacing, wherein the distance between each orifice plate and the rotor positioned next nearest the second end of the housing defines a second spacing, wherein the distance between each pair of adjacently located orifice plates defines a third spacing, wherein the distance between each pair of adjacently located rotors defines a fourth spacing, and wherein at least one of the first spacing, the second spacing, the third spacing and the fourth spacing is non-uniform.

17. The apparatus of claim 16, wherein each rotor plate has a shape that is a member of the group consisting of a pentagon, a heptagon, and a nonagon, and wherein the sides of the housing form a nonagon.

18. The apparatus of claim 16, wherein the orifices of at least two of the orifice plates are of different sizes.

19. The apparatus of claim 16, wherein the apices of the rotors are located on imaginary circles of generally increasing size with increasing distance from the first end.

20. The apparatus of claim 16, further comprising a plurality of circumferentially spaced members located proximate each of the rotors, wherein the members extend inwardly from the longitudinally extending corners toward the rotor.

21. The apparatus of claim 20, wherein one or more of the first spacing, the second spacing, the third spacing and the fourth spacing generally decreases with increasing distance from the first end, wherein the orifices generally increase in size with increasing distance from the first end, and wherein the apices of the rotors are located on imaginary circles of generally increasing size with increasing distance from the first end.

22. An apparatus adapted to pulverize material comprised of wet or dry discrete objects into relatively smaller-sized particles, comprising:
- a housing defining a longitudinal central axis, the housing including:

a first plate at a first end,
a second plate at a second end, the second plate including an opening through which the smaller sized particles exit the housing, and
longitudinally extending internal sides having a substantially polygonal-shaped lateral cross-section, the sides meeting in longitudinally extending corners;
a rotatable shaft extending substantially coextensively with the central axis;
a feed chute extending through an opening in the first plate, wherein the feed chute is adapted for introducing the material into the housing;
a plurality of rotors longitudinally spaced apart within the housing, each rotor comprising:
a rotor plate centrally coupled to the shaft for rotation therewith, the rotor plate having an approximately polygonal-shaped peripheral edge having apices; and
a plurality of vanes on a side of the rotor plate closest to the first end of the housing, each of the vanes extending approximately radially inward from one of the apices, a first rotor being a distributor rotor positioned closest to the first plate such that material introduced into the housing through the feed chute is directed toward the distributor rotor;
an orifice plate positioned between each pair of adjacently located rotors, each orifice plate extending inwardly from the internal sides of the housing to a central aperture which provides an orifice around the shaft; and
a plurality of members positioned in the longitudinally extending corners and projecting radially inward therefrom, wherein each member is located near a rotor.

23. The apparatus of claim 22, wherein the distance between each orifice plate and the rotor positioned next nearest the first end of the housing defines a first spacing, wherein the distance between each orifice plate and the rotor positioned next nearest the second end of the housing defines a second spacing, wherein the distance between each pair of adjacently located orifice plates defines a third spacing, wherein the distance between each pair of adjacently located rotors defines a fourth spacing, and wherein at least one of the first spacing, the second spacing, the third spacing and the fourth spacing is non-uniform.

24. The apparatus of claim 23, wherein one or more of the first spacing, the second spacing, the third spacing and the fourth spacing generally decreases with increasing distance from the first end, wherein the orifices generally increase in size with increasing distance from the first end, and wherein the apices of the rotors are located on imaginary circles of generally increasing size with increasing distance from the first end.

25. The apparatus of claim 22, wherein each rotor plate has a shape that is a member of the group consisting of a pentagon, a heptagon, and a nonagon, and wherein the sides of the housing form a nonagon.

26. The apparatus of claim 25, wherein members are positioned equally spaced in three of the longitudinally extending corners opposite each of the rotors.

27. The apparatus of claim 26, wherein the members provide support to the orifice plates.

28. The apparatus of claim 26, further including a motor coupled to the shaft for rotating the shaft at a rotational speed of at least 600 rpm.

29. The apparatus of claim 26, further comprising an input structure adapted to introduce a substance through the top plate into the housing, wherein the input structure is separate from the feed chute.

30. The apparatus of claim 29, wherein the input structure comprises a regulator mechanism configured to regulate a flow of a gas or a liquid into the housing.

31. The apparatus of claim 22, wherein the vanes of the distributor rotor comprise an upper edge that is beveled such that the elevation of the upper edge generally increases with increasing distance from the hub, the distributor rotor further including a ring fixed to the upper edge, the ring having a regular polygonal shape about aligned with the peripheral edge of the rotor plate.

32. The apparatus of claim 22, wherein vanes of at least one of the rotors are curved.

33. The apparatus of claim 22, wherein vanes are positioned to provide a small overhang over the peripheral edge of the rotor plate.

34. The apparatus of claim 22, wherein vanes are positioned with respect to an apex of the rotor plate such that a leading surface of the vane, defined with respect to a direction of rotation, is at the apex.

35. The apparatus of claim 22, wherein an end of each of the vanes located near an apical corner is shaped like the peripheral edge at that location.

36. The apparatus of claim 22, further comprising a heat exchanger on an outside wall of the housing configured to provide or remove heat from the housing.

37. An apparatus for pulverizing material comprised of wet or dry discrete objects into relatively smaller objects, comprising:
a housing including first and second ends, the first end including an input adapted to introduce the material into the housing, the second end including an output adapted to remove the smaller objects, wherein the housing includes longitudinally extending internal sides that form longitudinally extending interior corners where they meet;
a rotor assembly, including a rotatable shaft extending longitudinally through the housing between the first and second ends, and a plurality of rotors coupled to the shaft for rotation therewith, rotors of the plurality of rotors each comprising a rotor plate having a polygonal-shaped peripheral edge forming a plurality of apices, and vanes on a side of the rotor plate each extending approximately radially from an apex; and
an orifice plate positioned between adjacently located pairs of the plurality of rotors, each orifice plate extending inwardly from the internal sides of the housing to a central aperture which provides an orifice around the shaft.

38. The apparatus of claim 37, wherein each rotor plate includes an odd number of sides.

39. The apparatus of claim 37, wherein the peripheral edge of each rotor plate has a shape being a member of the group consisting of a pentagon, a heptagon and a nonagon.

40. The apparatus of claim 37, wherein the vanes are each positioned to provide a small overhang over the peripheral edge of their respective rotor plate.

41. The apparatus of claim 37, wherein an end of each of the vanes located near an apical corner is shaped like the peripheral edge at that location.

42. The apparatus of claim 37, wherein each of the vanes is curved in an arc.

43. The apparatus of claim 37, the plurality of rotors further including a distributor rotor located proximate the input, the distributor rotor comprising:
a rotor plate having a polygonal-shaped peripheral edge forming a plurality of apices;
vanes on a side of the rotor plate each extending approximately radially from an apex; and a ring fixed to upper edges of the vanes, the ring having a regular polygonal shape being about aligned with the peripheral edge of the rotor plate.

44. The apparatus of claim 37, wherein the orifices of at least two of the orifice plates are of different sizes.

45. The apparatus of claim 37, wherein the central aperture of each orifice plate has a diameter that is smaller than a circle defined by the locus of the apices of the rotor located immediately upstream from the orifice plate, wherein the upstream direction is determined by a direction of movement of the material through the housing.

46. The apparatus of claim 37, wherein the orifices generally increase in size with increasing distance from one of the first and second ends of the housing.

47. The apparatus of claim 37, further comprised of a plurality of circumferentially spaced members located proximate each of the rotors, wherein the members extend inwardly from the corners of the housing toward the rotors.

48. The apparatus of claim 47, wherein the internal sides of the housing form a regular nonagon in lateral cross section, and the peripheral edge of each rotor has a shape that is selected from the group consisting of a pentagon, a heptagon, and a nonagon.

49. The apparatus of claim 22, wherein the locus of the apices of each rotor defines a circle, the circles generally increasing in size with increasing distance from one of the first and second ends of the housing.

50. The apparatus of claim 22, wherein the distance between each orifice plate and the rotor positioned next nearest the first end of the housing defines a first spacing, wherein the distance between each orifice plate and the rotor positioned next nearest the second end of the housing defines a second spacing, wherein the distance between each pair of adjacently located orifice plates defines a third spacing, wherein the distance between each pair of adjacently located rotors defines a fourth spacing, and wherein at least one of the first spacing, the second spacing, the third spacing, and the fourth spacing is non-uniform.

51. The apparatus of claim 50, wherein one or more of the first spacing, the second spacing, the third spacing and the fourth spacing generally decreases with increasing distance from the first end of the housing, and wherein the orifices generally increase in size with increasing distance from the first end of the housing.

* * * * *